US009607087B1

(12) United States Patent
Ofek et al.

(10) Patent No.: US 9,607,087 B1
(45) Date of Patent: Mar. 28, 2017

(54) PROVIDING ANSWER BOXES BASED ON QUERY RESULTS (71) Applicant: Google Inc., Mountain View, CA (US)

(72) Inventors: Eran Ofek, Rehovot (IL); Benedict A. Gomes, Mountain View, CA (US); Tal Cohen, Atlit (IL); Anna Bendersky, Kiryat Motzkin (IL); Asaph Arnon, Givataim (IL); Nitsan Oz, Haifa (IL); Oren Naim, Zichron Yaakov (IL); Amitabh K. Singhal, Palo Alto, CA (US); Zvi Ben-Haim, Haifa (IL); Ziv Bar-Yossef, Herzliya (IL); Matan Kalman, Kfar Saba (IL); Gil Simha Briskin, Petach Tikva (IL)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 14/449,837

(22) Filed: Aug. 1, 2014

Related U.S. Application Data (60) Provisional application No. 61/861,333, filed on Aug. 1, 2013.

(51) Int. Cl.
G06F 17/30 (2006.01)
(52) U.S. Cl.
CPC .... *G06F 17/30864* (2013.01); *G06F 17/3053* (2013.01)

(58) Field of Classification Search
CPC ......... G06F 17/30864; G06F 17/30672; G06F 17/3064
USPC .................................. 707/706, 721
See application file for complete search history.

(56) References Cited

U.S. PATENT DOCUMENTS

| 7,917,489 B2 * | 3/2011 | Mukherjee ........ G06F 17/30672 707/707 |
| 2006/0282416 A1 * | 12/2006 | Gross ................ G06F 17/30864 |
| 2009/0259646 A1 * | 10/2009 | Fujita ................. G06F 17/3064 |

* cited by examiner

*Primary Examiner* — Monica Pyo
(74) *Attorney, Agent, or Firm* — Fish & Richardson P.C.

(57) ABSTRACT

Methods, systems, and apparatus, including computer programs encoded on computer storage media, for providing answer boxes based on query results. One of the methods includes receiving seed queries for an answer box; analyzing query log information, wherein analyzing query log information comprises identifying query results that have been provided in response to the seed queries; identifying one or more of the query results as answer box indicators based on the analyses of the query log information, wherein the answer box indicators are indicators for the answer box; and storing data identifying the one or more query results as answer box indicators for the answer box.

21 Claims, 4 Drawing Sheets

PROVIDING ANSWER BOXES BASED ON QUERY RESULTS

CROSS-REFERENCE TO RELATED APPLICATIONS

This application claims the benefit of U.S. Pat. App. Ser. No. 61/861,333 filed on Aug. 1, 2013, the entire disclosure of which is incorporated herein by reference.

BACKGROUND

This specification relates generally to digital information retrieval.

A search engine receives queries, for example, from one or more users and returns query results responsive to the queries. For example, the search engine can identify resources responsive to a query, generate query results with information about the resources, and cause the presentation of the query results corresponding to the resources in response to the query. Each search result can include, for example, a title of the resource, an address, e.g., URL, of the resource, and a snippet of content from the resource. Some queries can be better satisfied by directly providing information from resources responsive to the queries.

SUMMARY

This specification describes technologies relating to providing answer boxes based on query results.

In general, one innovative aspect of the subject matter described in this specification can be embodied in methods that include the actions of receiving seed queries for an answer box; analyzing query log information, wherein analyzing query log information includes identifying query results that have been provided in response to the seed queries; identifying one or more of the query results as answer box indicators based on the analyses of the query log information, wherein the answer box indicators are indicators for the answer box; and storing data identifying the one or more query results as answer box indicators for the answer box. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

Identifying the one or more query results as answer box indicators based on the analyses of the query log information can include, for each of the one or more query results, determining a number of times the query result has been provided in response to the seed queries from the query log information; and determining that the number of times satisfies a threshold number.

Identifying the one or more query results as answer box indicators based on the analyses of the query log information can include, for each of the one or more query results, determining a number of the seed queries that the query result has been provided in response to from the query log information; and determining that the number of the seed queries satisfies a threshold number.

Identifying the one or more query results as answer box indicators can include identifying URLs referenced by the one or more query results and keywords associated with the one or more query results as answer box indicators.

In general, another innovative aspect of the subject matter described in this specification can be embodied in methods that include the actions of obtaining query results responsive to a query, wherein each of the query results has a respective ranking; identifying answer box indicators from the query results, wherein the answer box indicators are indicators for an answer box, wherein each of the answer box indicators is associated with a query association score that represents an association between the answer box indicator and the query; determining an answer box score for the answer box from the query association scores for the answer box indicators; determining that the answer box score satisfies a first threshold; and providing the answer box. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The methods can further include the actions of receiving seed queries for the answer box; analyzing query logs, wherein the query logs contain data describing prior query results that have been provided in response to the seed queries, wherein the analyzing includes identifying the answer box indicators from the prior query results, wherein the answer box indicators are identified from the prior query results based on a frequency that the prior query results were provided in response to the seed queries.

The methods can further include the actions of identifying that a top-ranked query result, as indicated by the respective ranking of the query results, is not an answer box indicator; determining that a query association score for the top-ranked query result satisfies a second threshold; and suppressing the providing of the answer box.

The answer box indicators can be identified from a predetermined number of the query results with the greatest respective ranking scores.

The query association score that represents an association between the answer box indicator and the query can be determined from data that describes user selection of the answer box indicator in response to submitting the query.

Providing the answer box can include causing the query results and the answer box to be presented in an order based on the respective ranking of each of the query results. The methods can further include the actions of identifying the respective ranking of the answer box indicator with the greatest respective ranking of the query results, wherein causing the query results and answer box to be presented in the order includes causing the query results and answer box to be presented in the order based on the respective ranking of the answer box indicator with the greatest respective ranking score.

The subject matter described in this specification can be implemented in particular embodiments so as to realize one or more of the following advantages. Information in the form of answer boxes can be provided as direct answers to queries. Query results that are indicators for when answer boxes should be triggered can be determined. Changes to the query results that are indicators for an answer box, for example, as a consequence of timely or situational changes to the meaning associated with a query, can be seamlessly integrated into the answer box triggering decision. Answer boxes can be triggered for presentation in response to queries based on the query results for the queries. The decision to trigger an answer box for a user can be personalized based on the user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
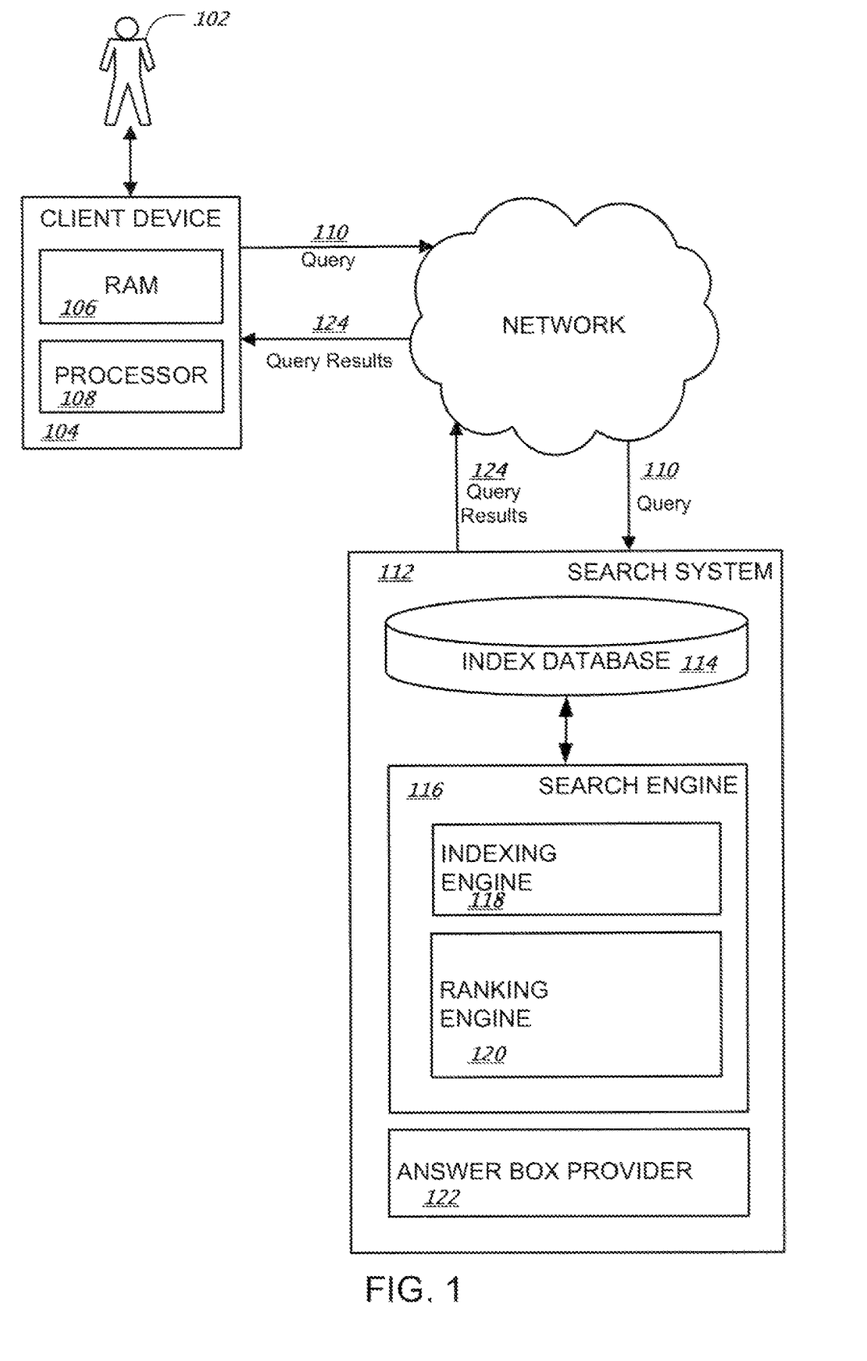
FIG. 1 illustrates an example search system for providing query results and answer boxes responsive to queries.

FIG. 1 illustrates an example search system 112 for providing query results and answer boxes responsive to queries as can be implemented for use in an Internet, an intranet, or another client and server environment. The search system 112 is an example of an information retrieval system in which the systems, components, and techniques described below can be implemented.

A user 102 can interact with the search system 112 through a client device 104. In some implementations, the client device 104 can communicate with the search system 112 over a network. For example, the client device 104 can be a computer coupled to the search system 112 through one or more wired or wireless networks, e.g., mobile phone networks, local area networks (LANs) or wide area network (WAN), e.g., the Internet. In some implementations, the client device 104 can communicate directly with the search system 112. For example, the search system 112 and the client device 104 can be implemented on one machine. For example, a user can install a desktop search system application on the client device 104. In some implementations, the search system 112 can be implemented as, for example, computer programs running on one or more computers in one or more locations that are coupled to each other through a network. The client device 104 will generally include a random access memory (RAM) 106, a processor 108, and one or more user interface devices, e.g., a display or speaker for output, and a keyboard, mouse, microphone, or touch sensitive display for input.

A user 102 can use the client device 104 to submit a query 110 to search system 112. The user can use the one or more user interface devices of the client device 104 to submit the query 110 to the search system 112. For example, the user 102 can interact with a user interface device to enter query 110 into a general user interface provided by the search system 112, e.g., a web page with a query text input field. Other methods of submitting queries to search engine 112 can also be performed. For example, the user 102 can submit the query 110 by speaking the query 110. An audio input device, e.g., microphone, associated with the client device 104 will detect the query 110 and transmit the query 110 to the search system 112. The query 110 can be submitted in natural language form, e.g., the language the user naturally writes or speaks in.

The search system 112 includes a search engine 116, an index database 114, and an answer box provider 122.

Search engine 116 identifies resources that match query 110. The search engine 116 can be, for example, an Internet search engine that takes action or identifies answers based on user queries, a question and answer system that provides direct answers to questions posed by the user, or another system that processes user requests. The search engine 116 will generally include an indexing engine 118 and a ranking engine 120. Indexing engine 118 processes and updates resources, e.g., documents, web pages, images, or news articles on the Internet, found in a corpus, e.g., a collection or repository of content, in index database 114 using conventional or other indexing techniques. An electronic resource, which for brevity will simply be referred to as a resource, may, but need not, correspond to a file. A document may be stored in a portion of a file that holds other resources, in a single file dedicated to the resource in question, or in multiple coordinated files.

The ranking engine 120 uses the index database 114 to identify resources responsive to the query 110, for example, using conventional or other information retrieval techniques. The ranking engine 120 calculates scores for the resources responsive to the query, for example, using one or more ranking signals. Each signal provides information about the resource itself or the relationship between the resource and the query. One example signal is a measure of the overall quality of the resource. Another example signal is a measure of the number of times the terms of the query occur in the resource. Other signals can also be used. The ranking engine 120 then ranks the responsive resources using the scores.

The search system 112 uses the resources identified and scored by the ranking engine 120 to generate candidate query results. The candidate query results include results corresponding to resources responsive to the query 110. For example, a candidate query result can include a title of a resource, a link to the resource, and a summary of content from the resource that is responsive to the query. A query result is associated with a ranking score, for example, the ranking score of the resource that corresponds to the query result.

The answer box provider 122 determines whether to provide answer boxes in response to the query. Answer boxes provide information directly in response to the query. The answers can include a summary of information responsive to the query. The summary of information can be generated from resources responsive to the query or from other sources. There can be different categories of answer boxes. An answer box category for a particular answer box is defined by the category of information presented by the particular answer box. The categories of information that can be presented by answer boxes can include, for example, stock market information, weather information, sports score information, or currency conversion information. For example, answer boxes that provide stock market information are categorized as stock answer boxes, answer boxes that provide weather information are categorized as weather answer boxes, answer boxes that provide sport score information are categorized as sports answer boxes, and answer boxes that provide currency conversion information are categorized as currency conversion answer boxes. Answer boxes, in response to queries, are presented to users. The category of the answer box dictates how the information is presented in the answer box. For example, a stock answer box can provide a chart of stock price as a function of time, whereas a weather answer box can provide a graphical representation of the weather, e.g., a sun or clouds. Additional information can be presented with the answer box. For example, query results for the query can be presented with the answer box. In some implementations, the additional information is presented in a user interface that separates the answer box from the query results. For example, the user interface may present the answer box in a shaded box distinct from the query results on the search results webpage of the search engine.

The answer box provider 122 determines whether to provide an answer box in response to the query 110. The determination to provide the answer box is based on the query results generated for the query. The answer box provider 122 obtains the query results generated by the search engine 116 in response to the query 110. From the query results 124, the answer box provider 122 identifies the query results that are indicators for the answer box. Query results that are indicators for answer boxes are identified from the query logs for seed queries, as described in more detail below with reference to FIG. 2. The answer box provider 122 determines whether to provide an answer box based on the query results that are indicators for the answer box, as described in more detail below with reference to FIG. 4.

If the answer box provider 122 determines to not provide the answer box, then the search system 112 provides the query results 124 to the client device 104 for presentation to the user 102. If the answer box provider 122 determines to provide the answer box, then the search system 112 provides the answer box to the client device 104 for presentation to the user 102. The search system 112 can provide additional information for presentation to the user 102, e.g., query results for the query 110, as described in more detail below with reference to FIG. 4. The query results 124 and/or the answer box are presented in an organized fashion to the user 102, e.g., a search engine results web page displayed in a web browser running on the client device. In some implementations, the answer box can be presented in an order based on the ranking of the query results that are indicators for the answer box, as described in more detail below with reference to FIG. 4.

Figure 2:
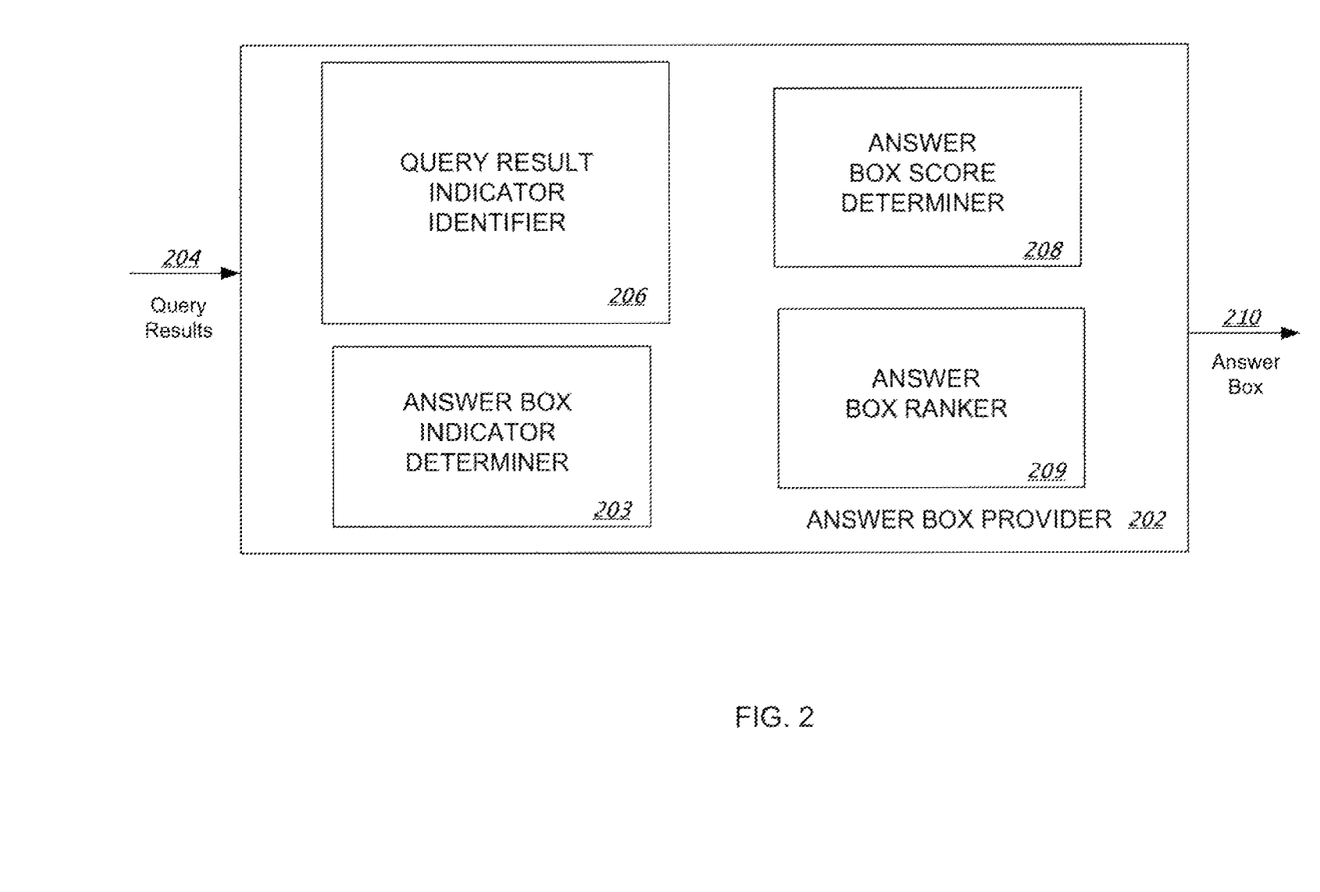
FIG. 2 illustrates an example answer box provider.

FIG. 2 illustrates an example answer box provider. The answer box provider 202 is an example of the answer box provider 122 described above with reference to FIG. 1.

The answer box provider 202 includes a query result indicators identifier 206, an answer box indicator determiner 203, an answer box score determiner 208, and an answer box ranker 209. The answer box provider 202 determines to provide an answer box in response to a query.

The answer box provider 202 obtains query results 204. The query results 204 are generated in response to a query submitted by a user by a search engine, as described above with reference to FIG. 1. The search engine provides the generated query results to the answer box provider 202. For example, the answer box provider 202 causes the search engine to transmit the query results to the answer box provider 202 after the query results are generated.

The query result indicator identifier 206 identifies from the obtained query results 204 answer box indicators. Answer box indicators are query results that are indicators for an answer box. In some implementations, the query result indicator identifier 206 receives information that identifies answer box indicators. For example, a system that determines answer box indicators for answer boxes provides information that describes answer box indicators for each answer box category to the query result indicator identifier 206. Alternatively, the system can receive a whitelist of answer box indicators for each answer box category. The query results in the whitelist can be identified by the uniform resource locators (URLs) or web addresses that are referenced by the respective query results. The URLs can identify domains, e.g., www.weather.com, and subdomains, e.g., www.weather.com/forecast of websites.

In some implementations, the answer box provider 202 determines answer box indicators for answer box categories. The answer box provider 202 includes an answer box indicator determiner 203 that determines answer box indicators, as described in more detail below with reference to FIG. 3. The answer box indicator determiner 203 stores the answer box indicators, as described in more detail below with reference to FIG. 3. In some implementations, the answer box indicator determiner 203 determines the answer box indicators before the answer box provider 202 receives the query results 204. For example, the answer box indicators can be determined and stored offline before the search engine receives the query. In some implementations, the answer box indicator determiner 203 determines the answer box indicators in response to the answer box provider 202 receiving the query results 204. In other words, the answer box indicators are determined for a query once the query is received by the search system.

The query result indicator identifier 206 identifies answer box indicators from the query results 204 using the received answer box indicator information and/or the answer box indicators determined by the answer box indicator determiner 203. For example, the query result indicator identifier 206 matches the answer box indicators stored by the answer box indicator determiner 203 or received by the query result indicator identifier 206 with the query results 204. The matched query results of the query results 204 are identified as answer box indicators for the query. In other words, the query result indicator identifier 206 identifies the query results, which are responsive to a present query to a search engine, that are indicators for answer boxes.

The answer box score determiner 208 determines an answer box score for each answer box category. The answer box score for a particular answer box is determined from the query association scores for the answer box indicators identified by the query result indicator identifier 206 for the particular answer box category, as described in more detail below with reference to FIG. 4. The answer box provider 202 determines to provide an answer box in response to the query if the respective answer box score satisfies a threshold score.

The answer box ranker 209 determines where to rank the answer box relative to the query results 204 based on the rankings and query association scores for the answer box indicators, as described in more detail below with reference to FIG. 4. For example, the answer box ranker 209 can determine to rank the answer box immediately below or above the top-ranked query result.

The answer box provider 202 provides the answer box to a client device for presentation to the user, as described in more detail below with reference to FIG. 4. In some implementations, the query results 204 can be additionally presented with the answer box. For example, the query results 204 can be presented in an order based on the ranking determined by the search engine that generated the query results 204. The answer box can be presented in an order relative to the query results 204 based on the ranking determined by the answer box ranker 209.

Figure 3:
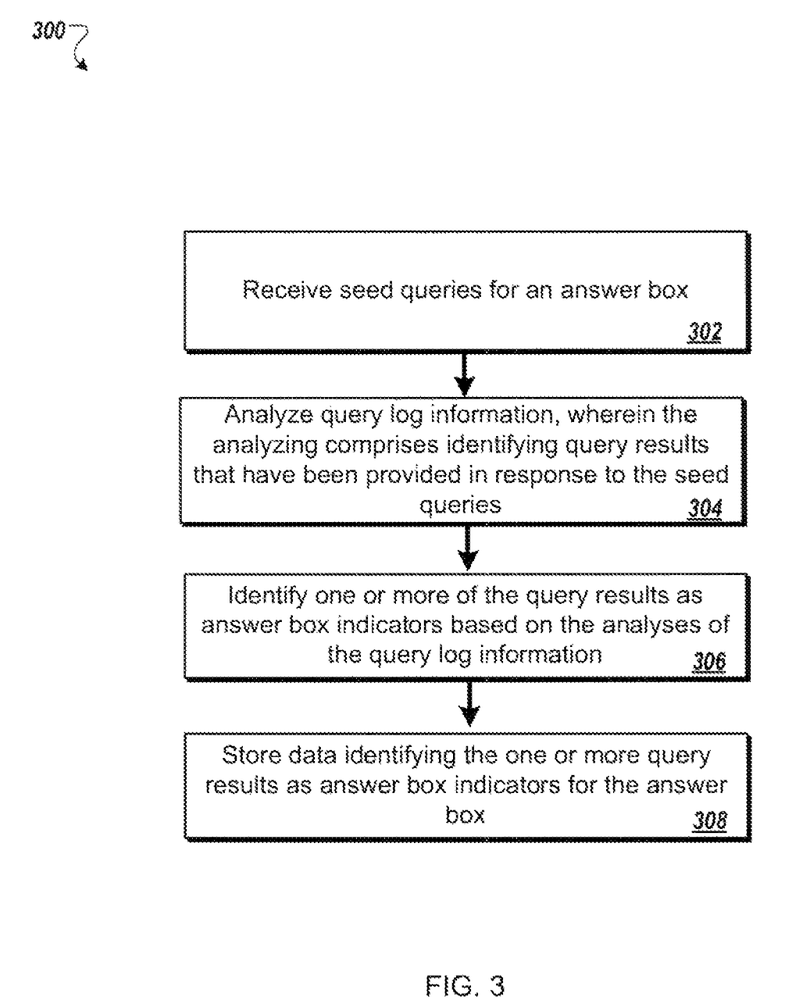
FIG. 3 illustrates an example method for determining answer box indicators.

FIG. 3 illustrates an example method for determining answer box indicators. For convenience, the example method 300 will be described in reference to a system that performs method 300. The system can be, for example, the answer box provider described above with reference to FIGS. 1 and 2. In some implementations, the system can include one or more than one more computers.

The system receives seed queries for an answer box (302). The seed queries for the answer box are queries in which the particular answer box provides information that is responsive to the seed queries. For example, the seed queries for a weather answer box can include "weather," "forecast," and "weather forecast." As a further example, the seed queries for a currency conversion answer box can include "conversion," "convert," and "USD." In some implementations, the seed queries can be templates that contain a base portion and a wildcard portion. The base portion of a template is a defined sequence of characters, whereas the wildcard portion allows for any sequence of characters. A seed query template allows for multiple combinations of seed queries with the same base portion. For example, the seed query "*weather*" allows for any combination of characters containing the word "weather" to be a seed query. The system can receive the seed queries for the different categories of answer boxes from one or more human hand raters. Alternatively, the system can receive the seed queries for the different categories of answer boxes from a system that determines such seed queries.

The system analyzes query log information (304). In some implementations, the system analyzes the query logs of the search system that it is a component of, e.g., the search system 112 described above with reference to FIG. 1. In some implementations, the system analyzes the query logs of multiple search systems, including search systems that it is not a component of, e.g., third-party search systems. The query logs contain data describing prior query results that have been provided in response to prior query submissions to search systems. These prior queries include the seed queries. Data describing prior query results can be the query results themselves, or the uniform resource identifiers (URIs) of the resources referenced by the query results, such as uniform resource locators (URLs) of resources.

The analyzing of the query log information comprises identifying the query results that have been provided in response to past search requests performed for the seed queries. In situations in which the systems discussed here collects user data, or makes use of user data, users may be provided with an opportunity to control whether programs or features collect user information, or to control whether and/or how to receive content from the systems that may be more relevant to the user. Thus, users may have control over how information is collected about the user and used by the systems.

The system identifies one or more of the query results as answer box indicators based on the analyses of the query log information (306). The one or more query results are identified from the query results identified as query results for the seed queries from the query log information.

In some implementations, whether a particular query result is determined to be an answer box indicator is based on the number of times the particular query result has been provided in response to the seed queries. A particular query result may be a specific query result, or any query result that references a specific resource. In the case of the latter, for example, two query results that are responsive to a particular seed query (or seed queries) may include a title of a resource, the link to the resource, but may have a different summary of content from the resource that is responsive to the query. Regardless, these are both counted as a particular query result. When a common resource link is used for query results, the resource itself is considered to be a resource indicator that is an indicator for the answer box, and may also serve as an answer box indicator.

For each of the one or more query results, the system determines a number of times the query result has been provided in response to the seed queries from the query log information. The system determines that the number of times satisfies a threshold number and determines that the query result is an answer box indicator. For example, if the system determines from the query log analyses that the query result has been provided twenty thousand times in response to the seed queries, and the predetermined threshold number is eighteen thousand times, then the system determines the query result to be an answer box indicator. Alternatively, the system can use a threshold percentage that represents the percentage of times the query result has been provided in response to the seed queries to determine whether the query result is an answer box indicator.

In some implementations, whether a particular query result is determined to be an answer box indicator is based on the number of seed queries that the particular query result has been provided in response to. For each of the one or more query results, the system determines a number of the seed queries that the query result has been provided in response to from the query log information. Again, the query result can be a particular query result, or can be all query results having a same URL identifying a particular resource. The system determines that the number of the seed queries satisfies a threshold number and determines that the query result is an answer box indicator. For example, if the system determines from the query log analyses that the query result has been provided in response to twenty of the seed queries, and the predetermined threshold number is ten, then the system determines the query result to be an answer box indicator. Alternatively, the system can use a threshold percentage that represents the percentage of seed queries that the query result has been provided in response to determine whether the query result is an answer box indicator.

In some implementations, whether a particular query result is determined to be an answer box indicator is based on the number of seed queries that the particular query result has been provided in response to and the number of times the particular query result has been provided in response to the seed queries.

The system stores data identifying the one or more query results as answer box indicators for the answer box (308). The number of query results that are answer box indicators stored for the answer box can vary based on the category of the answer box. For example, eight answer box indicators can be stored for a weather answer box and four hundred answer box indicators can be stored for a sports answer box.

In some implementations, the system identifies and stores the URLs, or a substring of the URLs, e.g., the URL's domain, referenced by the one or more query results as answer box indicators. Additionally, or alternatively, the system can identify and store keywords for the query results as answer box indicators. The keywords can be terms that describe the query result. For example, the keywords are terms from the title of the query result or frequently occurring terms in the document referenced by the query result.

In some implementations, the system filters the stored query results based on a frequency that the answer box indicators appear in query results. Query results that often appear in query results for queries submitted to a search engine are filtered out. For example, query results that appear in more than a threshold percentage, e.g., 10%, of all query results provided in response to queries are filtered from the query results stored by answer box indicator determiner 203.

Figure 4:
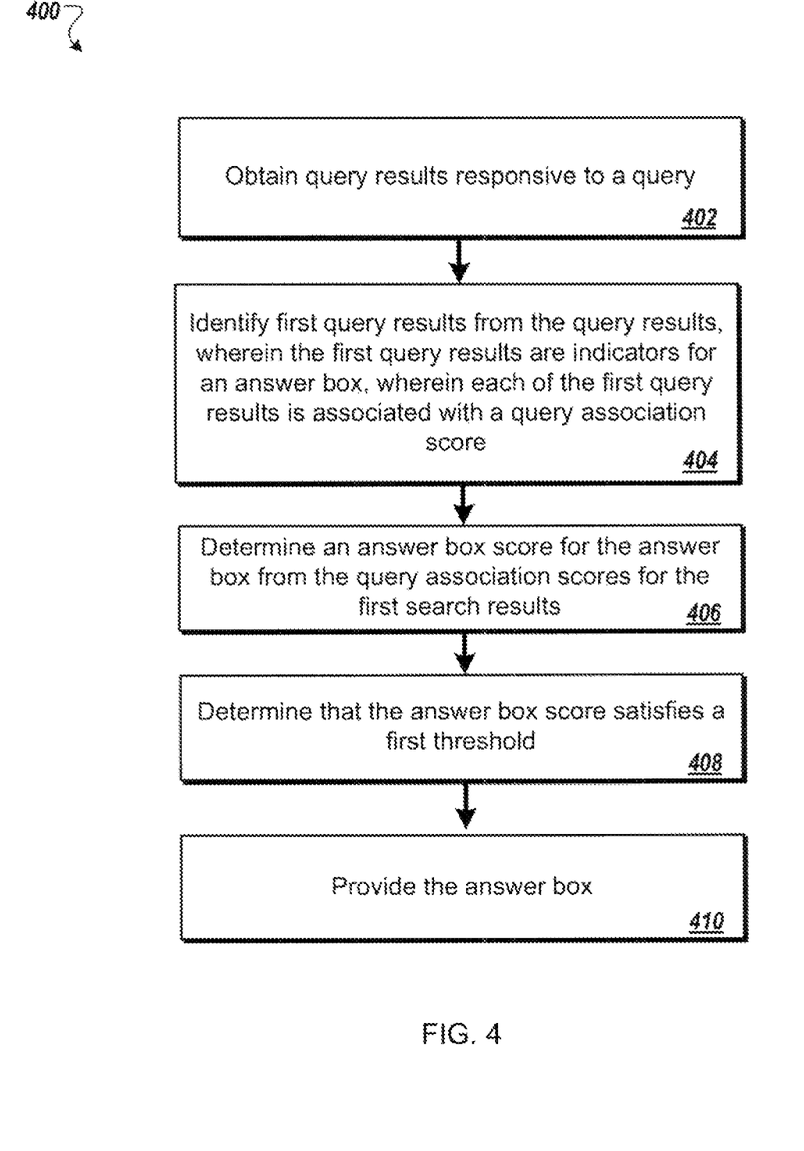
FIG. 4 illustrates an example method for providing answer boxes based on query results.

FIG. 4 illustrates an example method for providing answer boxes based on query results. For convenience, the example method 400 will be described in reference to a system that performs method 400. The system can be, for example, the answer box provider described above with reference to FIGS. 1 and 2. In some implementations, the system can include more than one more computers.

The system obtains query results responsive to a query (402). The system can obtain the query results from a search engine, as described above with reference to FIG. 2. The query results have respective rankings. The ranking for a query result is based on the ranking scores calculated by a search engine based on one or more ranking signals for the resource referenced by the query result.

The system identifies answer box indicators from the query results (404). The answer box indicators are query results that are indicators for an answer box. The system can identify the answer box indicators by determining which of the query results match a set of query results that are predetermined to be indicators for the answer box. The predetermined query results can be frequent query results for seed queries for the answer box, for example, the answer box indicators as described above with reference to FIG. 2. For example, the system can obtain information that describes predetermined query results that are indicators for the weather answer box. From the query results, the system can then identify the query results that are predetermined query results for the weather answer box as answer box indicators for the weather answer box.

In some implementations, the system can identify the answer box indicators from the query results by determining which of the query results reference resources that are resource indicators for the answer box. As described above with reference to FIG. 2, the system can store information that describes the resources referenced by the query result indicators for the answer box. These resources are resource indicators for the answer box. The resource indicators for the answer box can be identified by the URL, or sub-domain, of the resources. The system determines which of the query results reference resource indicators for the answer box by matching the identifiers, e.g., URLs, for the resources referenced by the query results with identifiers for the resource indicators for the answer box. The system identifies the query results that reference resources that match the resource indicators for the answer box as the answer box indicators. In some implementations, the system can identify the answer box indicators from the query results based on keywords of the query results. The keywords of the query results can be matched with keywords previously identified as answer box indicators, as described above with reference to FIG. 2. The query results with matching keywords can be identified as answer box indicators.

Each of the answer box indicators is associated with a query association score. The query association score for an answer box indicator represents an association between the answer box indicator and the query. In some implementations, the query association score for an answer box indicator is the ranking score for the answer box indicator. In some implementations, the query association score for the answer box indicator is determined from prior user behavior at instances of the answer box indicator presented in response to the query. Query logs can be analyzed to determine prior user behavior when presented with the answer box indicator in response to submitting the query to a search engine. For example, the query logs can be used to determine the number of times that users have selected, e.g., clicked, the answer box indicator when the answer box indicator is presented in response to the query. Alternatively, or additionally, the query logs can be used to determine the percentage of times that users have selected the answer box indicator when the answer box indicator is presented in response to the query. The query association score for the answer box indicator can be determined from a combination of the number and the percentage of times that users have selected the answer box indicator when the answer box indicator is presented in response to the query. In some implementations, the query association scores for the answer box indicators are determined from the respective ranking scores and respective user behavior data for the answer box indicators.

In some implementations, the system identifies answer box indicators from a predetermined number of the query results with the greatest respective ranking scores. In such implementations, only a predetermined number of query results with the greatest respective ranking scores can be identified as answer box indicators. For example, the system identifies only those query results that have one of the ten greatest respective ranking scores out of the query results and are indicators for the answer box.

The system determines an answer box score for the answer box from the query association scores for answer box indicators (406). In some implementations, the system combines the query association scores to determine the answer box score. For example, the query association scores can be multiplied or added, with optional weighting, to generate the answer box score.

The system determines that the answer box score satisfies a first threshold (408).

The system provides the answer box (410), as described above with reference to FIG. 2. In some implementations, the system provides just the answer box to be presented to the user. The system can determine whether to provide just the answer box based on the environment in which the answer box is being provided. For example, the system determines that the answer box is to be provided to a mobile device, e.g., smart phone or PDA, and causes only the answer box to be provided to the mobile device. As a further example, the system can determine that it is providing the answer box to a client device that has a low bandwidth Internet connection, and causes only the answer box to be provided to the client device. As a further example, the system determines that a display screen that does not satisfy a minimum screen size will display the provided answer box, and causes only the answer box to be provided to the client device. In some implementations, the system provides additional information to be presented with the answer box.

For example, the system causes the answer box to be presented with the query results for the query. The answer box and query results can be presented in an order based on the respective rankings of the query results. In some implementations, the order in which the answer box is presented relative to the query results is based on the respective ranking of the answer box indicator with the greatest respective ranking of the answer box indicators. The system identifies the respective ranking of the answer box indicator with the greatest respective ranking, determines the order that the answer box should be presented based on the respective ranking, and causes the answer box to be presented in the determined order. For example, if the answer box indicator with the greatest respective ranking of the answer box indicators is not the top-ranked query result of the query results, then the answer box is presented immediately below the answer box indicator. If the answer box indicator is the top-ranked query result of the query results, the system additionally considers the query association score for the answer box indicator to determine the order in which to present the answer box. For example, if the query association score for the answer box indicator with the greatest respecting ranking of the answer box indicators satisfies a second predetermined threshold, then the answer box is presented immediately below the answer box indicator. If the query association score does not satisfy the second predetermined threshold, then the answer box is presented above the answer box indicator. Alternatively, the system can cause the answer box to be always presented immediately below the answer box indicator with the greatest respective ranking of the answer box indicators.

In some implementations, the system can additionally perform a method to suppress the providing of answer boxes in parallel with the method 400 to provide answer boxes. The system identifies the top-ranked query result, i.e., the query result with the greatest respective ranking of the query results. The system determines that the top-ranked query result is not an indicator for the answer box. For example, the system identifies that the top-ranked query result is not a query result indicator. The system determines that the query association score for the top-ranked query result satisfies an answer box suppression threshold score. The system suppresses the providing of the answer box. For example, if the method 400 causes the answer box to be provided with the query results, this parallel method can override that process by preventing the answer box from being provided. Therefore, only the query results are provided in response to the query.

In some implementations, the system can personalize the triggering of answer boxes. Whether an answer box should be triggered can be personalized for the user that submits the query to the search engine. The personalized triggering of answer boxes can be based on information associated with the user, for example, the user's geographical location, search history, or entities of interest. For example, in response to the query "Eagle" from a user geographically located in Eagle, Id., the personalized system can determine to trigger the weather answer box for weather in Eagle, Id., and not trigger the sports answer box for the Philadelphia Eagles game scores. This personalization can suppress or trigger the providing of answer boxes in parallel with the method 400. Continuing the example above, if the method 400 causes the Philadelphia Eagles sports answer box to be triggered for the user, the system can prevent the sports answer box from being provided to the user due to the personalization. As a further example, if the method 400 does not cause the Eagle, Id. weather answer box to be triggered, the system can still trigger the weather answer box to be displayed to the user due to the personalization.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   receiving seed queries for an answer box that is to be provided in response to queries;
   analyzing query log information, wherein analyzing query log information comprises identifying query results that have been provided in response to past search request performed by the seed queries;
   identifying one or more uniform resource locator from one or more of the query results as answer box indicators based on the analyses of the query log information, wherein the answer box indicators are indicators for the answer box;
   storing data identifying the one or more query results as answer box indicators for the answer box;
   receiving, from a user device, a search query input by a user, the search query being different from the seed queries;
   obtaining search query results responsive to the search query, wherein each of the query results has a respective ranking;
   identifying answer box indicators from the search query results based on a matching of search query results for the search query to the answer box indicators identified for the seed queries, wherein each of the answer box indicators has a query association score that represents an association between the answer box indicator and the search query;

determining an answer box score for the answer box from the query association scores for the answer box indicators identified from the search query results;

determining that the answer box score satisfies a first threshold; and in response to determining that the answer box score satisfied the first threshold score, providing the answer box in response to the search query.

2. The method of claim 1, wherein identifying one or more uniform resource locators from the one or more query results as answer box indicators based on the analyses of the query log information comprises:

for each of the one or more query results:
determining a number of times the query result has been provided in response to the seed queries from the query log information; and
determining that the number of times satisfies a threshold number.

3. The method of claim 2, wherein determining a number of times the query result has been provided in response to the seed queries from the query log information comprises determining the number of times query results having a same URL identifying a particular resource have been provided in response to the seed queries.

4. The method of claim 1, wherein one or more uniform resource locators from the identifying the one or more query results as answer box indicators based on the analyses of the query log information comprises:

for each of the one or more query results:
determining a number of the seed queries that the query result has been provided in response to from the query log information; and
determining that the number of the seed queries satisfies a threshold number.

5. The method of claim 4, wherein determining a number of the seed queries that the query result has been provided in response to from the query log information comprises determining the number of seed queries for which query results having a same URL identifying a particular resource have been provided in response to the seed queries.

6. The method of claim 1, wherein identifying one or more uniform resource locators from the one or more query results as answer box indicators comprises:

identifying URLs referenced by the one or more query results and keywords associated with the one or more query results as answer box indicators.

7. The method of claim 1, further comprising:

identifying that a top-ranked query result, as indicated by the respective ranking of the query results, is not an answer box indicator;

determining that a query association score for the top-ranked query result satisfies a second threshold; and suppressing the providing of the answer box.

8. The method of claim 1, wherein the answer box indicators are identified from a predetermined number of the query results with the greatest respective ranking scores.

9. The method of claim 1, wherein the query association score that represents an association between the answer box indicator and the query is determined from data that describes user selection of the answer box indicator in response to submitting the query.

10. The method of claim 1, wherein providing the answer box comprises:

causing the query results and the answer box to be presented in an order based on the respective ranking of each of the query results.

11. The method of claim 10, further comprising:

identifying the respective ranking of the answer box indicator with the greatest respective ranking of the query results, wherein causing the query results and answer box to be presented in the order comprises:

causing the query results and answer box to be presented in the order based on the respective ranking of the answer box indicator with the greatest respective ranking score.

12. A system, comprising:

one or more computers configured to perform operations comprising:

receiving seed queries for an answer box that is to be provided in response to queries;

analyzing query log information, wherein analyzing query log information comprises identifying query results that have been provided in response to past search request performed by the seed queries;

identifying one or more uniform resource locators from one or more of the query results as answer box indicators based on the analyses of the query log information, wherein the answer box indicators are indicators for the answer box;

storing data identifying the one or more query results as answer box indicators for the answer box;

receiving, from a user device, a search query input by a user, the search query being different from the seed queries;

obtaining search query results responsive to the search query, wherein each of the query results has a respective ranking;

identifying answer box indicators from the search query results based on a matching of search query results for the search query to the answer box indicators identified for the seed queries, wherein each of the answer box indicators has a query association score that represents an association between the answer box indicator and the search query;

determining an answer box score for the answer box from the query association scores for the answer box indicators identified from the search query results;

determining that the answer box score satisfies a first threshold; and in response to determining that the answer box score satisfied the first threshold score, providing the answer box in response to the search query.

13. The system of claim 12, wherein identifying one or more uniform resource locators from the one or more query results as answer box indicators based on the analyses of the query log information comprises:

for each of the one or more query results:
determining a number of times the query result has been provided in response to the seed queries from the query log information; and
determining that the number of times satisfies a threshold number.

14. The system of claim 13, wherein determining a number of times the query result has been provided in response to the seed queries from the query log information comprises determining the number of times query results having a same URL identifying a particular resource have been provided in response to the seed queries.

15. The system of claim 12, wherein identifying one or more uniform resource locators from the one or more query results as answer box indicators based on the analyses of the query log information comprises:
- for each of the one or more query results:
  - determining a number of the seed queries that the query result has been provided in response to from the query log information; and
  - determining that the number of the seed queries satisfies a threshold number.

16. The system of claim 15, wherein determining a number of the seed queries that the query result has been provided in response to from the query log information comprises determining the number of seed queries for which query results having a same URL identifying a particular resource have been provided in response to the seed queries.

17. The system of claim 12, wherein identifying one or more uniform resource locators from the one or more query results as answer box indicators comprises:
- identifying URLs referenced by the one or more query results and keywords associated with the one or more query results as answer box indicators.

18. A non-transitory computer storage medium encoded with a computer program, the program comprising instructions that when executed by one or more computers cause the one or more computers to perform operations comprising:
- receiving seed queries for an answer box that is to be provided in response to queries;
- analyzing query log information, wherein analyzing query log information comprises identifying query results that have been provided in response to past search request performed by the seed queries;
- identifying one or more uniform resource locators from one or more of the query results as answer box indicators based on the analyses of the query log information, wherein the answer box indicators are indicators for the answer box;
- storing data identifying the one or more query results as answer box indicators for the answer box;
- receiving, from a user device, a search query input by a user, the search query being different from the seed queries;
- obtaining search query results responsive to the search query, wherein each of the query results has a respective ranking;
- identifying answer box indicators from the search query results based on a matching of search query results for the search query to the answer box indicators identified for the seed queries, wherein each of the answer box indicators has a query association score that represents an association between the answer box indicator and the search query;
- determining an answer box score for the answer box from the query association scores for the answer box indicators identified from the search query results;
- determining that the answer box score satisfies a first threshold; and
- in response to determining that the answer box score satisfied the first threshold score, providing the answer box in response to the search query.

19. The computer storage medium of claim 18, wherein identifying one or more uniform resource locators from the one or more query results as answer box indicators based on the analyses of the query log information comprises:
- for each of the one or more query results:
  - determining a number of times the query result has been provided in response to the seed queries from the query log information; and
  - determining that the number of times satisfies a threshold number.

20. The computer storage medium of claim 18, wherein identifying one or more uniform resource locators from the one or more query results as answer box indicators based on the analyses of the query log information comprises:
- for each of the one or more query results:
  - determining a number of the seed queries that the query result has been provided in response to from the query log information; and
  - determining that the number of the seed queries satisfies a threshold number.

21. The computer storage medium of claim 18, wherein identifying one or more uniform resource locators from the one or more query results as answer box indicators comprises:
- identifying URLs referenced by the one or more query results and keywords associated with the one or more query results as answer box indicators.

* * * * *